United States Patent
Benz et al.

(10) Patent No.: US 7,679,727 B2
(45) Date of Patent: Mar. 16, 2010

(54) METHOD AND SYSTEM FOR DETERMINING THE POSITION OF A RECEIVER UNIT

(75) Inventors: Paul Benz, Diepoldsau (CH); Jürg Hingerling, Marbach (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 11/914,723

(22) PCT Filed: May 16, 2006

(86) PCT No.: PCT/EP2006/004606
§ 371 (c)(1),
(2), (4) Date: Nov. 16, 2007

(87) PCT Pub. No.: WO2006/122747
PCT Pub. Date: Nov. 23, 2006

(65) Prior Publication Data
US 2008/0204699 A1    Aug. 28, 2008

(30) Foreign Application Priority Data
May 18, 2005    (EP)    .................................. 05104208

(51) Int. Cl.
*G01C 3/08*    (2006.01)
(52) U.S. Cl. ..................................... 356/4.01
(58) Field of Classification Search ....... 356/3.01–3.15, 356/4.01–4.1, 5.01–5.15, 6–22
See application file for complete search history.

(56) References Cited

U.S. PATENT DOCUMENTS

| | | | |
|---|---|---|---|
| 4,662,752 A |  | 5/1987 | Tucker |
| 4,687,326 A | * | 8/1987 | Corby, Jr. ................... 356/5.01 |
| 5,237,384 A | * | 8/1993 | Fukunaga et al. ....... 356/139.06 |
| 5,537,201 A | * | 7/1996 | Kumagai et al. ........... 356/4.08 |
| 5,733,031 A |  | 3/1998 | Lin et al. |
| 6,381,006 B1 |  | 4/2002 | Ramstroem |
| 6,545,751 B2 |  | 4/2003 | Beliveau et al. |
| 6,646,732 B2 |  | 11/2003 | Ohtomo et al. |
| 2001/0009458 A1 | * | 7/2001 | Asaka et al. ................ 356/28.5 |
| 2004/0135992 A1 | * | 7/2004 | Munro ....................... 356/4.01 |
| 2007/0064246 A1 | * | 3/2007 | Braunecker et al. ......... 356/614 |

FOREIGN PATENT DOCUMENTS

| | | |
|---|---|---|
| EP | 1 517 117 | 3/2005 |
| WO | WO 2005/031259 | 4/2005 |

* cited by examiner

*Primary Examiner*—Thomas H Tarcza
*Assistant Examiner*—Luke D Ratcliffe
(74) *Attorney, Agent, or Firm*—Workman Nydegger

(57) ABSTRACT

Disclosed are a method and a system for determining the position of a receiver unit. According to said method, modulated radiation is generated by at least one radiation projector, and a number of reference points, from among which reference points lying within a detection range of the receiver unit are detected, are projected by means of said modulated radiation. Positional data, particularly location data and/or orientation data, is derived for the receiver unit from the radiation of said reference points.

34 Claims, 7 Drawing Sheets

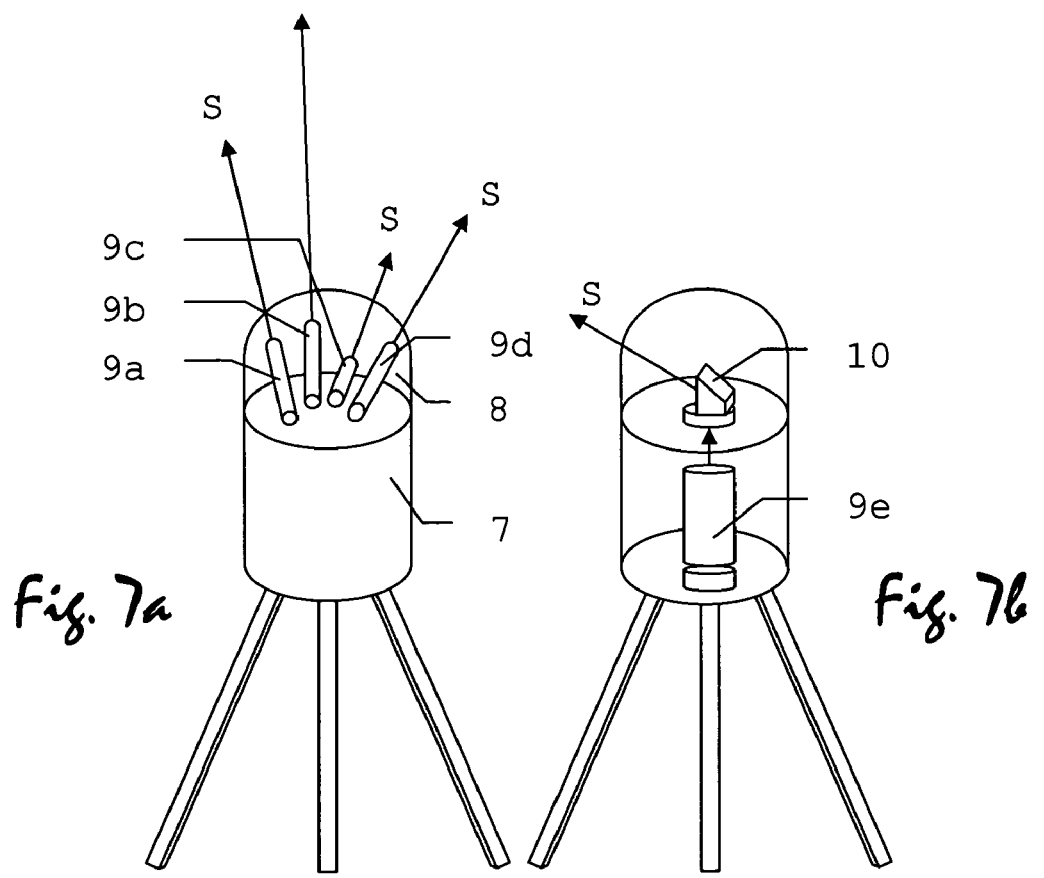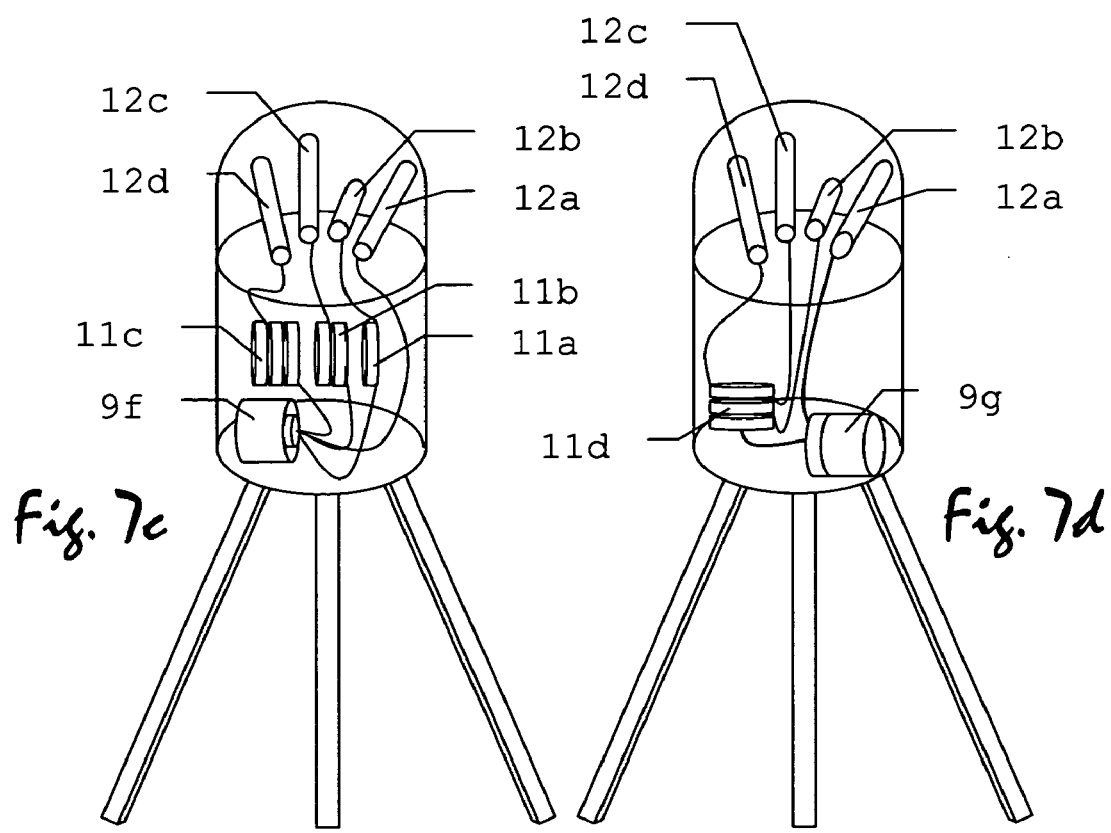

METHOD AND SYSTEM FOR DETERMINING THE POSITION OF A RECEIVER UNIT

The invention relates to a method for determining the position of a receiver unit and a system for determining the position.

In many geodetic applications, methods and systems for determining the position, i.e. for determining the location and/or orientation, of a surveying instrument are used. From a location determined by means of such a system, further measurements which are linked to the location and generally also require knowledge of the orientation of the measuring device in space are then generally carried out. In principle, the orientation of the instrument can also be derived from the determination of the location of two or more points. For measuring applications, in general 6 degrees of freedom of a hand-held measuring device, but generally the location and hence 3 degrees of freedom, have to be determined for unambiguously fixing the absolute position in space. If constraining conditions are present, such as, for example, movement in a defined plane, the determination of fewer degrees of freedom may also be sufficient for fixing location and orientation. The problem therefore comprises the determination of location and orientation as two objects which can in principle be achieved separately but which must be carried out in association for many applications. As a rule, both location and orientation of a generally hand-held device are therefore required.

An example of location determination systems is global positioning systems, such as, for example, GPS, GLONASS or the European Galileo system currently being set up. These systems are based on as far as possible undisturbed reception of satellite signals, which however may also be obstructed by obstacles and therefore limited in their usability. Owing to their shading effect, the reception of signals may be limited or completely impossible in the immediate vicinity of obstacles, so that a location determination is no longer possible with this system. These limitations relate in particular to measurements in interior rooms of buildings in which the reception of a number of satellites which is required for positioning can generally be ruled out. A further problem is that global positioning systems do not always provide the required accuracy of position determination or require greater effort, for example through the use of a reference station or longer measuring times.

A further example is the determination of the location of a reflector-carrying instrument with a theodolite or tacheometer. By means of a direction or distance measurement with the tacheometer to the geodetic instrument, it is also possible to determine the location of the instrument if the location of the tacheometer is known. In conjunction with automated target recognition and target tracking, a quasi-continuous location determination can be achieved. A precondition for the measurement here is the line of sight between the two components. If this single link is interrupted, for example by foliage or buildings in the field of view, the method of location determination fails. In addition, only one instrument at a time can be tracked by a motorized tacheometer, so that a large number of theodolites also has to be used, for example in the case of many vehicles on a building site. Use of a large number of theodolites which cover virtually the entire region to be surveyed without gaps in the visible range is generally prohibitive owing to the outlay in terms of equipment and personnel. Moreover, such a solution requires a high level of complexity and constant communication to the control of the measuring process.

So-called robotic total station systems which are operated from the level pole or plumb rod constitute a customary variant. Such one-man operation devices are commercially available and are offered by many manufacturers. The automated theodolite supported as a rule by a video camera serves as a fixing station which optically tracks the hand-held level pole or plumb rod. The coordinates of the target point are calculated at the central station, transmitted to the sighting unit and displayed there. These devices, too, all have the disadvantage that a direct line of sight to the level pole or plumb rod is essential. Furthermore, dynamic tracking has additional disadvantages since the fixing station can lose the target in the case of large accelerations.

For permitting the actual location as the current location of the instrument under all conditions with the required accuracy, methods are known which are based on a determination of the actual location relative to objects known with regard to their location as reference objects or reference points. An example of this is the classical resection method. If it is now intended to derive actual locations for a geodetic instrument or a positioning device suitable for this from a knowledge of reference points, the reference points must be fixed beforehand and must be surveyed with sufficient accuracy. In general, special components are mounted for this purpose, either active transmitters, such as, for example, microwave transmitters, or passive systems, for example reflectors, being used.

The determination of the actual location or actual orientation is effected by a measurement to the reference points and/or further measurements, for example an inclination measurement, and hence relative to the perpendicular or horizontal, from which the actual location or the actual orientation can be derived. Here, location and/or orientation can in principle be determined absolutely, i.e. by an isolated measurement to points of known location, or relatively, i.e. with observation of the change of known location or orientation relative to a zero position.

In many cases a geodetic instrument has only a capability of distance measurement or measurement of angles cannot be carried out with the required precision or speed. In these cases, the location determination must be carried out only by distance measurements. For this purpose, the distances to a plurality of points having a known location are measured, and the actual position can be determined by known methods, as are also used, for example, in photogrammetry. Correlation methods or correlation calculations are an example of this. The number of required points is dependent on the position thereof and the intended accuracy of the measurement. As a rule, however, apart from particularly favorable configurations, at least 3 or 4 points are required. If an angle is additionally taken into account, for example by additionally determining the angle relative to the horizontal, the number of points can be reduced to two.

The number of points actually required in each case is dependent on the position of the known points and any possible limitations for reducing an ambiguity. In the case of three distance measurements to the various reference points, the three known locations define a plane at which the actual position to be determined can be reflected. The resulting solution comprises two possible locations, one of which, however, is generally ruled out for plausibility reasons, for example because it would lie below the Earth's surface, or on the basis of other simple information, such as, for example, the distinction between North and South, which can also be made by a simple magnetic compass. An unambiguous determination with three known points is possible if favorable geometric conditions are present. This is the case, for example, if the location sought lies on a connecting line between two known points.

The known approaches of the prior art are generally based on the mounting of a sufficient number of radiation sources, for example in the microwave range, at exactly known locations. The absolute or relative position can then be determined relative to these transmitters. However, many sources have to be positioned and measured for this purpose, which results in considerable complexity in terms of equipment and handling.

Other approaches for local positioning systems are based on passive points of known location. Thus, for example, PCT/EP2004/010571 discloses a system for determining the actual position of a measuring device, in which at least two reference points located in a spatial segment scanned by means of a laser beam are detected and are measured with respect to their distance and their angle of inclination. From the known locations of these reference points designed to be detectable and the coordinated distances and angles of inclination, the actual location of the measuring device can be derived. The detection, tracking and surveying of the reference points are carried out in an automated manner by the measuring device, the measuring device and the reference points forming coordinated, specially formed elements of a local positioning and/or orientation measurement system. In this system, however, the reference points must be actively scanned by means of a laser beam and must be illuminated, so that the reception component in the measuring device has to have a very complex design. In addition, transmitter and receiver are placed in a single device and linked structurally to one another so that, for example, it is not possible for a plurality of receivers to use the light of a common, central transmitter, which is in fact due to the passive design, i.e. only in reflection of the light signal emitted by the measuring device. In addition, this design limits the number of usable reference points since these can be scanned only within the emission cone of the transmitter present in the measuring device and furthermore sequentially.

Furthermore, the objective reference points must be mounted and measured before the measurement, which requires a certain effort or is impossible in some regions.

In addition, the detection of a reference point may present problems under certain circumstances since a reference point is not always unambiguously detectable during a scanning movement, for example if the laser beam strikes a shiny object, which can then be inadvertently interpreted as a reference point. In order to solve this problem, it is possible to use an image recording method, which however makes the apparatus, in particular the optical beam path, even more complex. In principle, this problem also applies to the identification of the reference points.

Owing to the scanning movement, the availability of the reference points is very limited with respect to time. One solution describes 2 trackers which keep both transmitter and receiver aligned with the corresponding reference point. The requirements with respect to the accuracy of alignment of such target-tracking apparatuses are, however, very demanding, which is applicable in particular to hand-held measuring devices.

An apparatus from U.S. Pat. No. 6,381,006 comprising 3 reference stations which emit laser radiation in a fan shape is also known. The system is operated from the level pole or plumb rod. The spatial coordinates are defined by the 3 emitted light fan beams. 3 Direction sensors which survey the position of the level pole or plumb rod in space by means of the light fan beams are present on the hand-held level pole or plumb rod. The location at the target point is therefore determined. In order also to be able to survey or to set out poorly accessible measuring points, the level pole or plumb rod is also equipped with a reflectorless distance meter. The apparatus has the disadvantage that there is the requirement for a line of sight simultaneously to 3 reference stations, which have to be placed as a rule at eye level. This precondition is scarcely fulfilled in the building sector or on building sites with traffic. In addition, the technical design of the reference stations is complex, the effort being further increased by the requirement for a multiplicity of such stations.

A further spatial position system having likewise rotating light fan beams is disclosed in the documents U.S. Pat. Nos. 6,545,751 and 6,646,732. The 3D coordinate determination of a hand-held sighting unit, which is described there, is based on time or interval measurement of in each case at least 2 light fan beams emitted by a fixing station. These apparatuses likewise have the disadvantage that there must be a line of sight between the hand-held sighting unit and the at least 2 reference stations. In this approach, too, a great effort and high complexity are required.

All solutions with rotating light fan beams moreover have the disadvantage of the troublesome influence of vibration, produced by the rotating modules.

An object of the present invention is to provide a simplified method and an apparatus or a system of reduced complexity which permits a determination of the actual location and of the orientation of a hand-held measuring device even in strongly transected terrain or in interior rooms.

A further object is to simplify or to improve the handling in the case of the setting up of such a system and the components thereof.

These objects are achieved by the subjects of claims 1 and 11, respectively, or of the dependent claims or the achievements are further developed.

The invention relates to a method for determining a location and/or an orientation of a receiver unit and a system for determining a location and/or an orientation.

The approach according to the invention is based on the fact that the direct positioning of radiation sources or objects which can be illuminated by such sources can be replaced by a projection of reference points. For this purpose, a set of detectable radiation or light spots is produced by one or more projection units and said spots are detected and evaluated as reference points by a receiving unit. Both relative and absolute positionings of orientation determinations can be carried out. The means for producing reference points and the receiving unit can be positioned independently of one another so that a set of fixed reference points is provided by the means for producing reference points, relative to which reference points the receiving unit is oriented or is determined in its orientation or location.

In addition, there is no need to position reference points; panels, reflective foils, white-painted walls or other objects which may represent natural surfaces or are in any case present are sufficient. The transmitter irradiates the diffusely reflecting or partly reflective object, and the reference objects form only as a result of the light spot on the object. A plurality of laser beams results in the formation of a correspondingly large number of reference points, i.e. the number of reference points is determined by the number of laser projections, the projection units in turn being independent of the measuring device or of the receiving unit, and in theory being as large as desired. Consequently, the availability of the reference points is high, and the projection unit or the totality thereof can continuously produce the corresponding reference points on the object.

For this purpose, the space to be surveyed is transected or "flooded" with detectable radiation from a plurality of radiation projectors or—depending on the specific design of the source—from one or more corresponding multi-transmitter units or a multiple laser projector as means for producing reference points. The means for producing reference points, which can preferably be in a form of a multi-transmitter unit, act as a reference station, constitute a sort of laser projector. The number of emitted laser beams is at least 3, but typically 4 laser units or projections of reference points are present. In analogy to global positioning systems, a number of detectable reference points which is predetermined by the existing constraints and environmental conditions and the desired accuracy of measurement must always be present for the receiver unit. Depending on geometry, area to be covered and environmental conditions, such as, for example, obstacles, the total set of reference points to be projected may also be less than 3 or substantially greater than 4. The projection can be produced by a single multi-transmitter unit or by a plurality of such units, it being possible for the units to have a communication link to one another. At the same time, the radiation of a common source can also be transmitted and projected via a relay station. The reference points can in principle be projected simultaneously, but also in sequence at an appropriately high rate, this, however, advantageously being chosen so that a progressive, i.e. continuous or uninterrupted, optical link between the receiving unit and the projected reference points can be maintained. For this purpose, the detection of the reference points can also be effected for a plurality of reference points, i.e. in particular 3 reference points, simultaneously or at an appropriately high rate for maintaining the optical link.

The light to be projected is moreover modulated with high frequency, in particular intensity-, phase- or polarization-modulated, it being possible for the radiation to be in the visible as well as in the infrared wavelength range or in even longer-wave ranges. The preferably collimated and emitted light beams strike stationary surfaces and are reflected by them into space, in particular into the region to be surveyed. The reflection may be diffuse or directed, it being possible for the reflecting surfaces to be natural surfaces, such as, for example, walls of a room to be surveyed, reflective areas, such as, for example, window fronts, or special reflective marks simulating satellites or special reflective materials which can be set up or mounted at suitable points. Marks having a transmissive or combined effect can also be realized.

The laser units or radiation projectors emit modulated radiation, for example the modulated light of the 3 or more transmission units being coupled rigidly to one another with respect to phase. The associated information is formed in such a way that mm-accurate or even sub-mm-accurate distance information can be determined from the transit time or phase position of the modulation, which may be considered as a typical measure for the required accuracy of geodetic measurement.

As a result of the modulation or coding, information is propagated or transmitted. The laser beams are modulated and are coupled to one another rigidly with respect to phase or with respect to time and transmit the transit time or phase from the laser projector via the objects forming reference points to the receiver, which is spatially separated from the transmitter. The link to the reflective object is or can be at least permanently maintained.

In addition, owing to the generally diffuse reflection by the object, such as, for example, a house wall or the like, the entire room to be surveyed is continuously flooded with measuring light. The availability of the distance information is therefore great in comparison with a scanning and searching movement.

With a preferably hand-held receiver unit, the laser light scattered by the satellites, reference points or walls, produced by these 3, typically 4, transmission units, is detected. From the relative transit times or phase positions of the modulation forms, the location of the detector can be calculated. The reference points are positioned so that they can be seen from that region of the room which is to be surveyed. The protection also makes it possible to produce the reference points at elevated areas so that good detectability is ensured. The projection can take place onto suitable structures which are in any case present, such as, for example, ceilings of interior rooms, or onto special objects. Such objects are, for example, spheres or reflective panels which can be adhesively bonded to natural surfaces and can be set up so as to be visible by means of an extendable rod system.

The location or orientation determination is effected either relative to an assigned zero position whose position is known or absolutely. For the first approach, the measuring device with the receiver unit is positioned at the location of the zero position at the beginning of the method and the radiation of the reference points is detected and measured. If the coordinates of the reference points are known, this can be effected by a prior measurement; thus, the relative location or orientation determination can be begun directly on the receiver side. The drift relative to the zero position is determined from the change in characteristics superposed on the radiation or modulated.

If, on the other hand, the coordinates of the reference points are not known, the location of the reference points can be determined by a resection method. The hand-held receiver unit is positioned according to the location of the zero position preferably at one, two or three further known locations which, together with the zero position, define the direction and length of the unit vectors of the one-, two- or three-dimensional coordinate system.

The approach for absolute positioning or orientation is thus based on a knowledge of the position of the detected reference points, so that these must be measured beforehand or must be positioned at points known with respect to their position. From a knowledge of the absolute location of the reference points, the distances thereof from the laser projector and the received modulated signals, the absolute location or orientation of the receiver unit can be derived.

Both the measurement of the absolute position and the relative position determination include the analysis of the radiation originating from reference points with regard to distance information, either the distance itself or the change in a distance being considered. Here, it is possible in principle to resort to the known distance-measuring methods, such as phase measurement or transit time measurement, for example the relative position, as a function of time, of a signal superposed on the radiation or a phase segment forming the basis of the measurements.

A first approach according to the invention for signal processing of the received radiation is based on the phase measurement principle, the principle resembling the GPS surveying method. However, in contrast to the GPS method, it is not the phase of the one carrier signal but that of the intensity or polarization modulation of the laser light that is measured and is evaluated in the manner of a conventional distance meter according to the phase measurement principle.

In order to be able to identify and distinguish the various reference points or laser sources, for example, each laser source can be modulated with its own frequency. For example, the following frequencies are expedient for distinguishing the individual transmitters: 33 MHz, 31 MHz, 29 MHz, 27 MHz. The signal received at the receiver unit can then be divided according to frequencies and the phases thereof can be individually determined.

It is also possible to realize a distinction between the signals according to the optical wavelengths, but also by an additional modulation, as used in a similar manner, for example, in the GPS system with a C/A code.

The receiver unit measures the phase of the radiation scattered by the reflection points. By means of a clock signal which is generated by a local oscillator with crystal accuracy as standard time, the measurement of the phase of the signals coordinated with the transmission units is effected. If the receiver unit is provided with an atomic clock, 3 modulated transmitted signals are sufficient; for the case of a less accurate standard time in the case of the receiver unit, at least 4 modulated transmitted signals are required in order to achieve a location determination with mm accuracy.

The heterodyne method customary in phase distance measurement can also be used for the frequency transformation. This makes it possible to realize the phase measurement on low-frequency signals by means of digital electronic modules and evaluation methods.

The absolute phases (ambiguity resolution, number of modulation wavelengths) and hence the distances to the satellites and finally the location (3 coordinates x, y, z) of the receiver unit can be determined by the known methods of signal evaluation of GPS systems.

For the determination of the absolute phases (ambiguity resolution), it is also possible to use a more complex modulation method of laser light. The number of modulation wavelengths at which two frequencies simultaneously or one frequency with phase scanning are modulated on the carrier light can be derived, for example, by means of bimodulation.

A second approach according to the invention can be realized by the method of pulsed transit time measurement. Light pulses are emitted by the laser gun and in turn are mutually delayed with respect to time and are rigidly coupled to one another.

Through the choice of low pulse repetition frequencies in the Hz to kHz range, the unambiguity range and hence the measuring range of the apparatus can be from several 100 m to 1000 m.

The identification of the reference points or reflection points can in turn be permitted by different carrier or light wavelengths. In the simplest case, these can be masked by ensuring that the light pulses occur in succession as a function of time.

In the case of the time-related masking, corresponding time intervals are coordinated with the individual laser sources or satellites. One of the pulses can additionally be provided with a coding feature for identification of the beginning of the sequence. For example, a longer light pause is attached to the last pulse before the pulse sequence is repeated beginning with the first pulse.

The identification of the individual laser sources is likewise possible as an incremental method by means of a continuous detection and analysis of the delay of the individual pulses. However, this approach has fundamental problems if the beam is interrupted.

Compared with the phase measurement, the transit time measurement has advantages such as, for example, higher sensitivity, higher measuring speed, longer range, but in particular the greater robustness with respect to ambient light. In addition, a frequency synthesizer is easier to realize since a single pulse frequency is sufficient for all laser sources.

An association of the relative referencing with a space-related or superior coordinate system can be achieved by various approaches.

In the case of referencing to a floor which is already horizontal, the hand-held receiver unit is placed at 3 points on the floor and a measurement is triggered in each case. As a result, the horizontal plane is known and any arbitrary height above the floor can now be set out with the receiver unit.

In the case of referencing to a coordinate system also determined in the azimuth, a procedure similar to the horizontal plane transmission can be followed. Once again, 3 measuring points in the horizontal plane of the floor are recorded, 2 of the points being in the azimuth-determining direction. This direction may be, for example, the edge between floor and a side wall.

There are also further setup methods known to the person skilled in the art. If, for example, there is interest only in the distance from a wall, the position of the side wall can be recorded by means of a 3-point measurement. The receiver unit is then able to determine the distance to the wall continuously.

A further setup method can be carried out by means of a suitable accessory. Examples of such accessories are plumb rod, plumb laser, telescope sights equipped with a tilt sensor, but also cross hairs or double prisms for angles of 90° for referencing along a line between 2 points and normals thereto.

The method according to the invention and a system according to the invention comprising corresponding receiver units and radiation projectors are described in more detail below, purely by way of example, with reference to working examples shown schematically in the drawing. Specifically, FIG. 1 shows the diagram of a first use example for the method according to the invention for determining the location of a construction machine;

Figure 8:
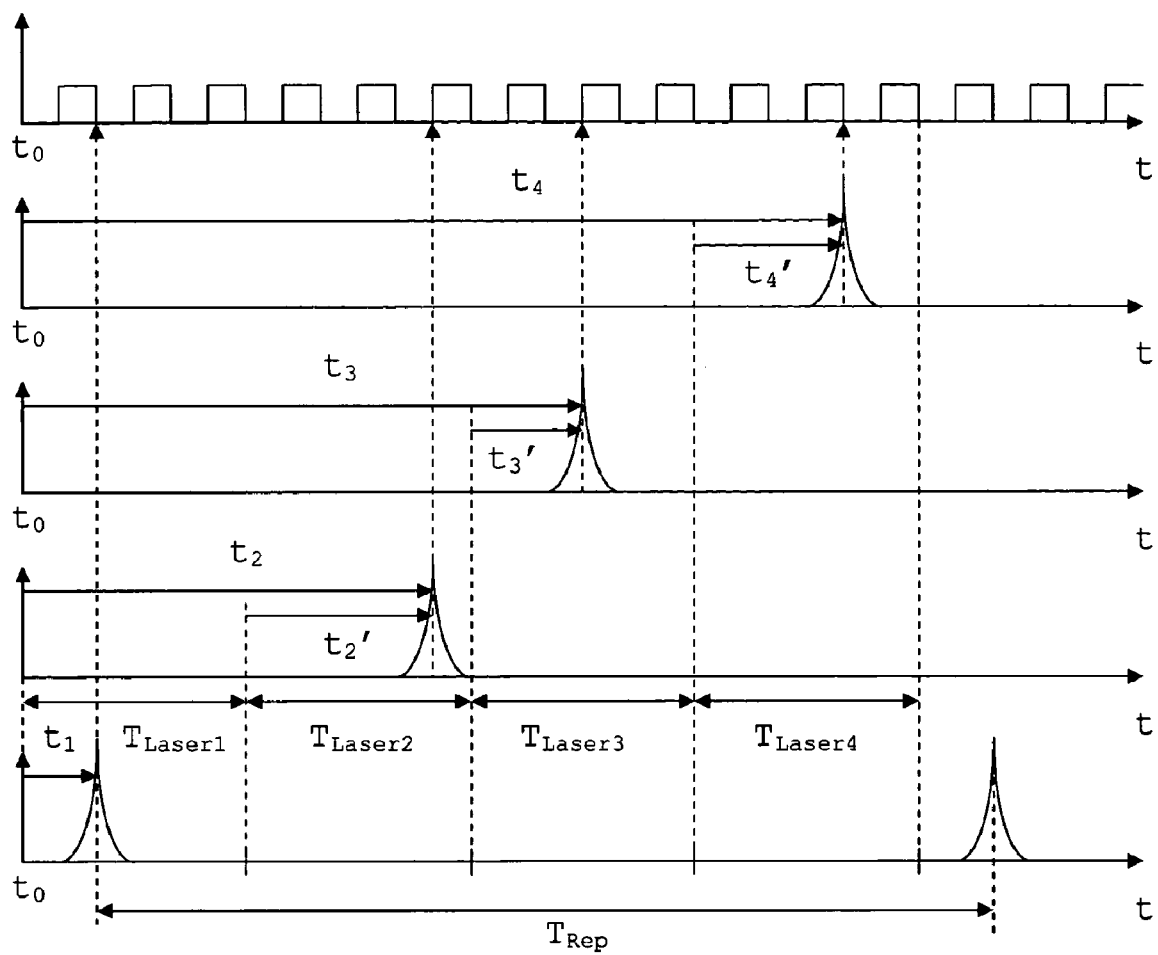
Figure 9:
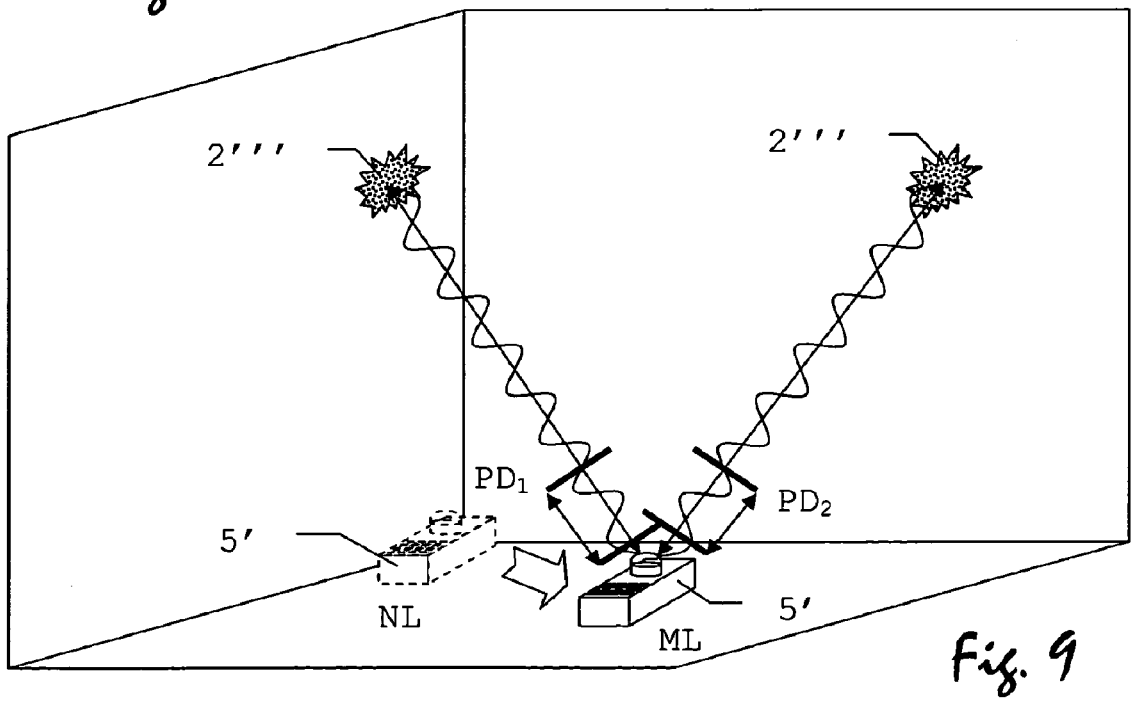
Figure 10:
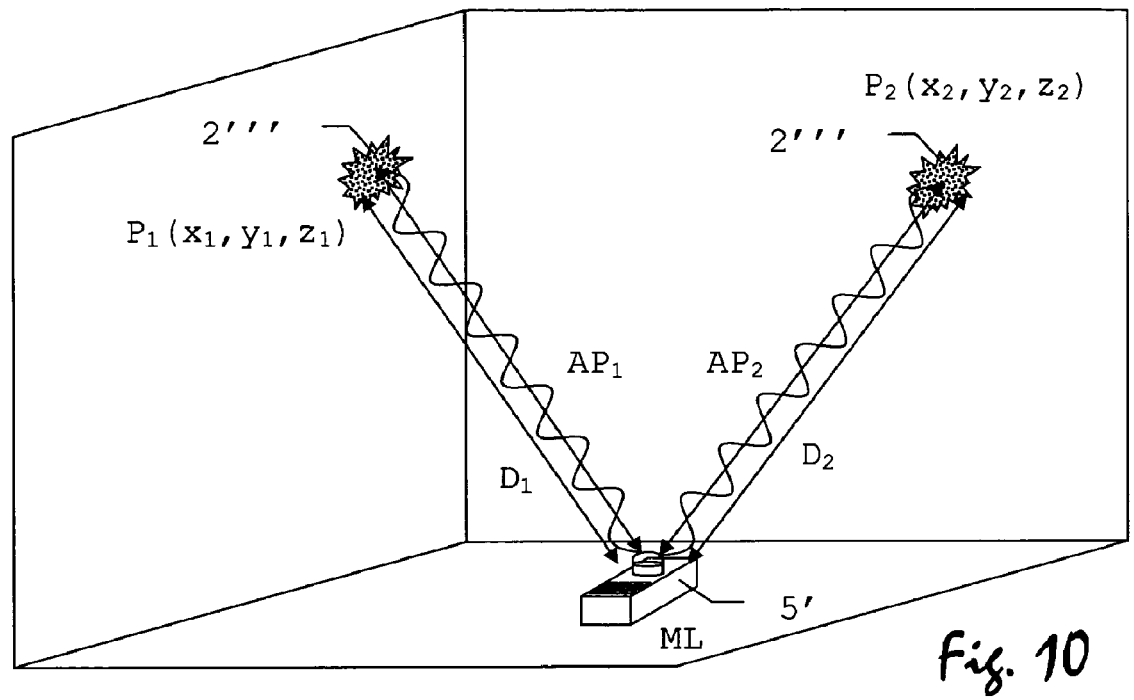
Figure 11:
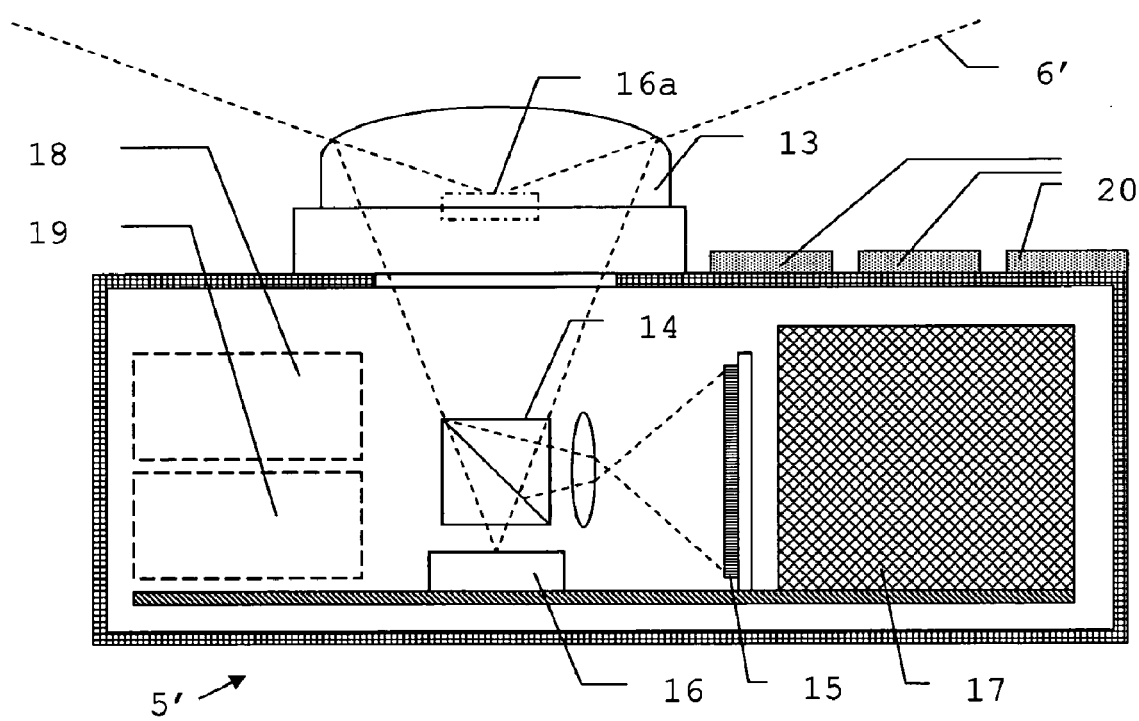
Figure 12:
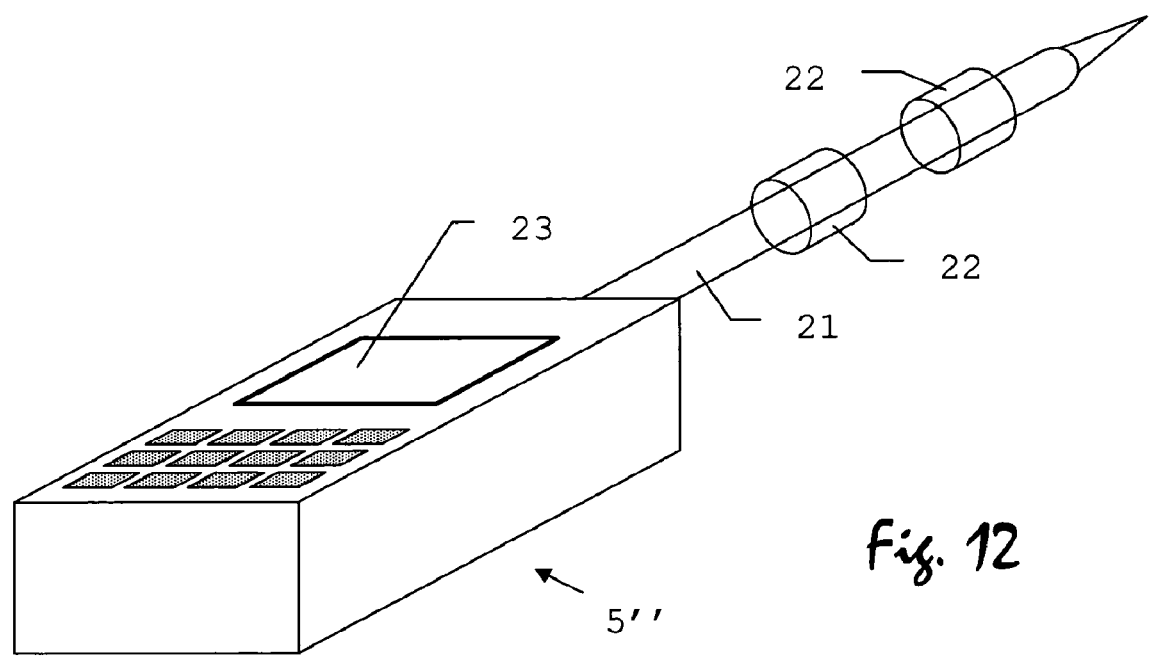
Figure 13A:
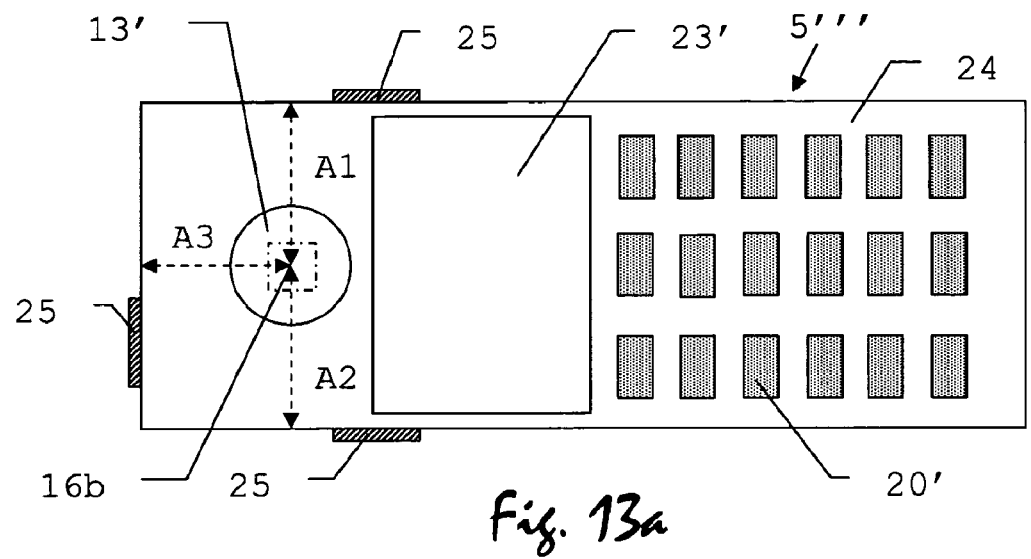
Figure 13B:
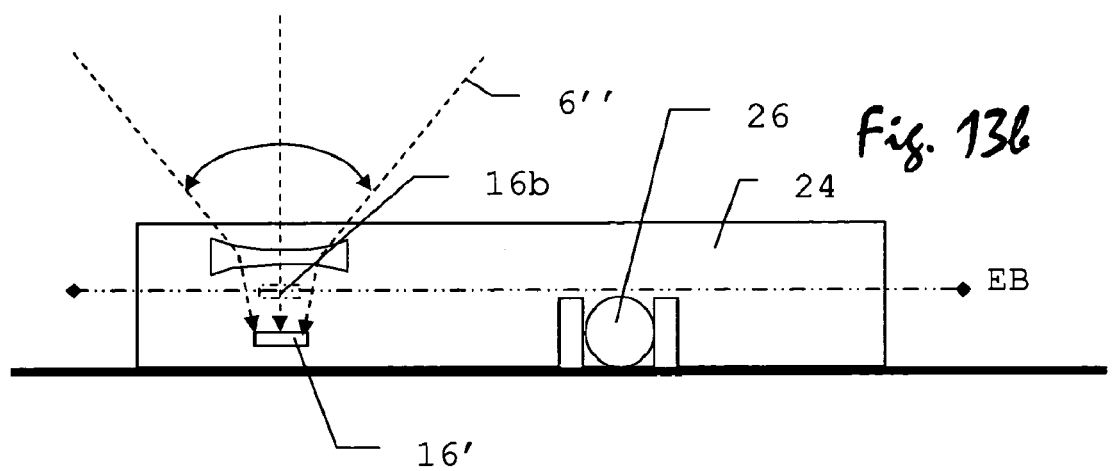

FIG. 7*a-d* show the diagram of working examples of the radiation projector according to the invention;

FIG. 8 shows the diagram of the signal curves as a function of time for the method according to the invention based on the transit time measuring principle;

FIG. 9 shows the diagram of the method according to the invention based on the phase measuring principle with measurement and determination of the relative phases;

FIG. 10 shows the diagram of the method according to the invention based on the phase measuring principle with measurement of the absolute phases;

FIG. 11 shows the diagram of a first working example of the receiver unit according to the invention;

FIG. 12 shows the diagram of a second working example of the receiver unit according to the invention and FIG. 13*a-b* show the diagram of a third working example of the receiver unit according to the invention.

Figure 1:
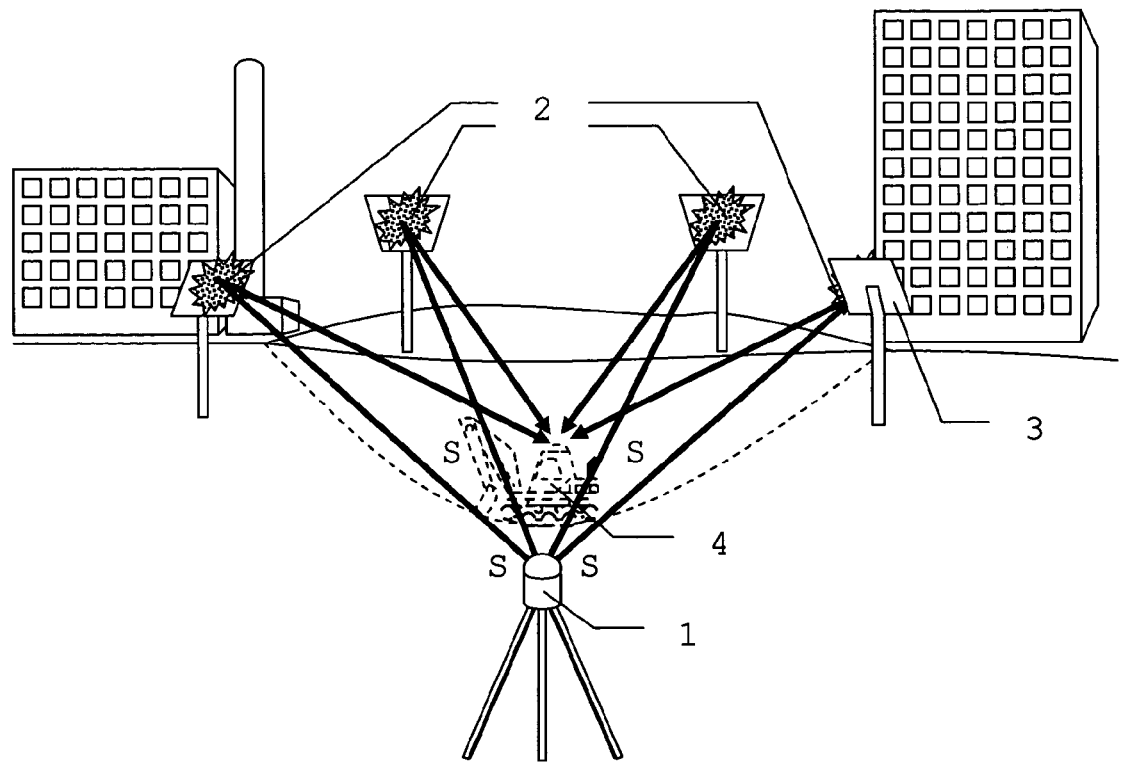

FIG. 1 shows, by way of example, a first use example for the method according to the invention for determining the position of a construction machine 4. In this example, the construction machine 4 is present in a trench, so that direct sighting by a centrally placed unit, such as, for example, by at total station, is not possible. According to the invention, a set of reference points 2, which in turn can be detected by the construction machine 4, is projected by a radiation projector 1. For this purpose, electromagnetic radiation S, preferably laser light, is sent to locations which can be seen from the construction machine 4. In order to achieve a corresponding coverage of the space to be processed, it is advantageous under certain circumstances to use special components, such as, for example, the projection panels 3 shown here purely by way of example. These projection panels 3 may have, for example, a white or spectrally optimized surface which is arranged on a stand so as to be extendible. By means of a plurality of such projection panels 3, coverage of the processing region can be achieved.

Figure 2:
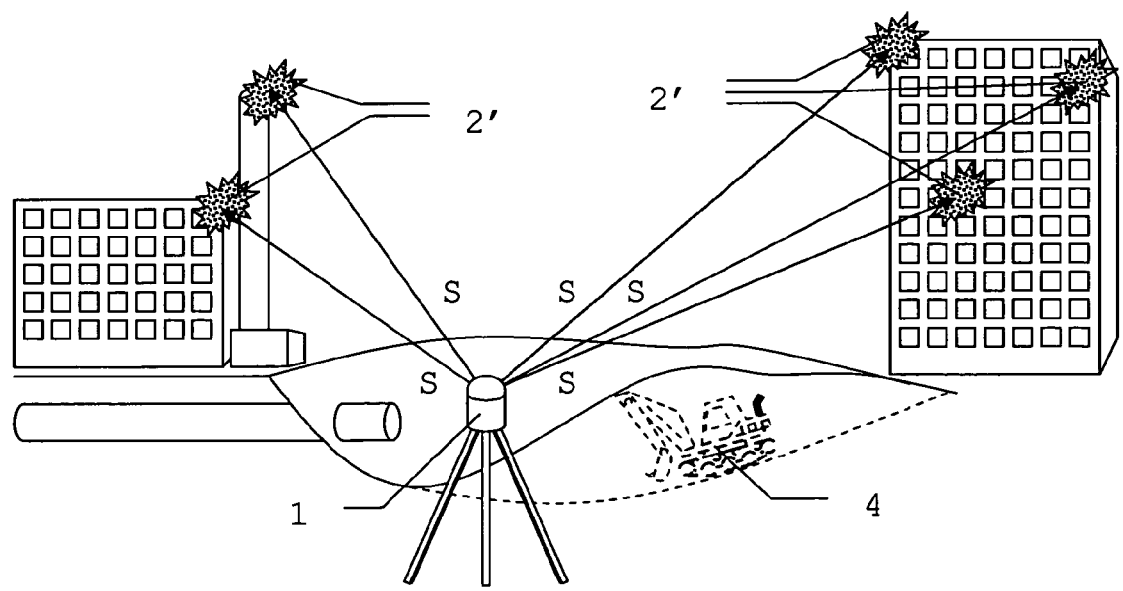
FIG. 2-3 show the diagram of a second use example for the method according to the invention for determining the location of a construction machine.
Figure 3:
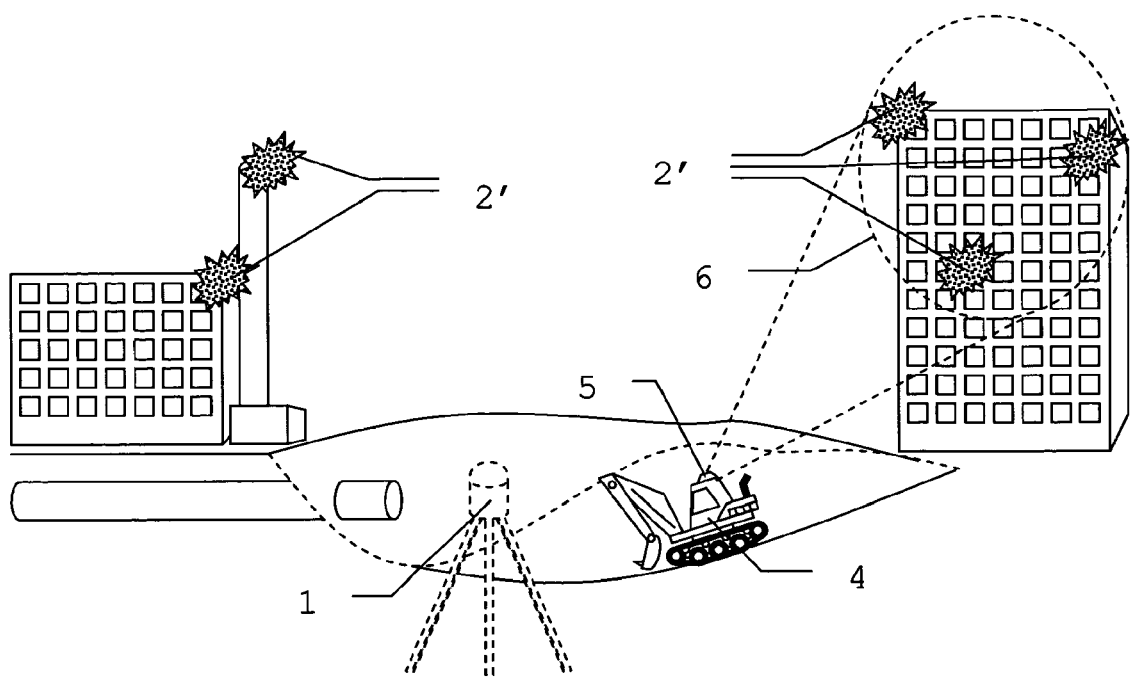

FIG. 2-3 show the diagram of a second use example for the method according to the invention for determining the location of a construction machine 4. As shown in FIG. 2, natural surfaces can also be used instead of the projection panels of the first working example, it also being possible, if appropriate, for said natural surfaces to be adapted in their back-radiating characteristic by special treatment, such as, for example, smoothing, or the mounting of components, such as, for example, mirror foils or reflector foils, reflective paint or spheres. The radiation projector 1 now projects the electromagnetic radiation S onto existing structures and thus produces a set of reference points 2'. For example, spheres can be illuminated by means of a collimated laser beam so that a relatively large part of the space is illuminated by the reflected radiation. For this purpose, beam diameter and sphere diameter are tailored to one another. However, it is of course also possible to use the special components, such as, for example, the projection panels of FIG. 1, and natural structures together.

FIG. 3 explains the determination of the position of the construction machine 4 on the basis of the projected reference points 2'. Those reference points 2' of the set of the reference points which are within the detection region 6 of a receiver unit 5 are detected by the construction machine 4. The number of reference points 2' required for determining the position, i.e. location and/or orientation, is dependent on the desired accuracy and on possible limitations of the degrees of freedom by specified information or constraints, for example movement on a horizontal surface without irregularities. In general, however, four reference points 2' are required for determining the position of the receiver unit 5 and hence of the construction machine 4 in a manner similar to a global positioning system.

Figure 4:
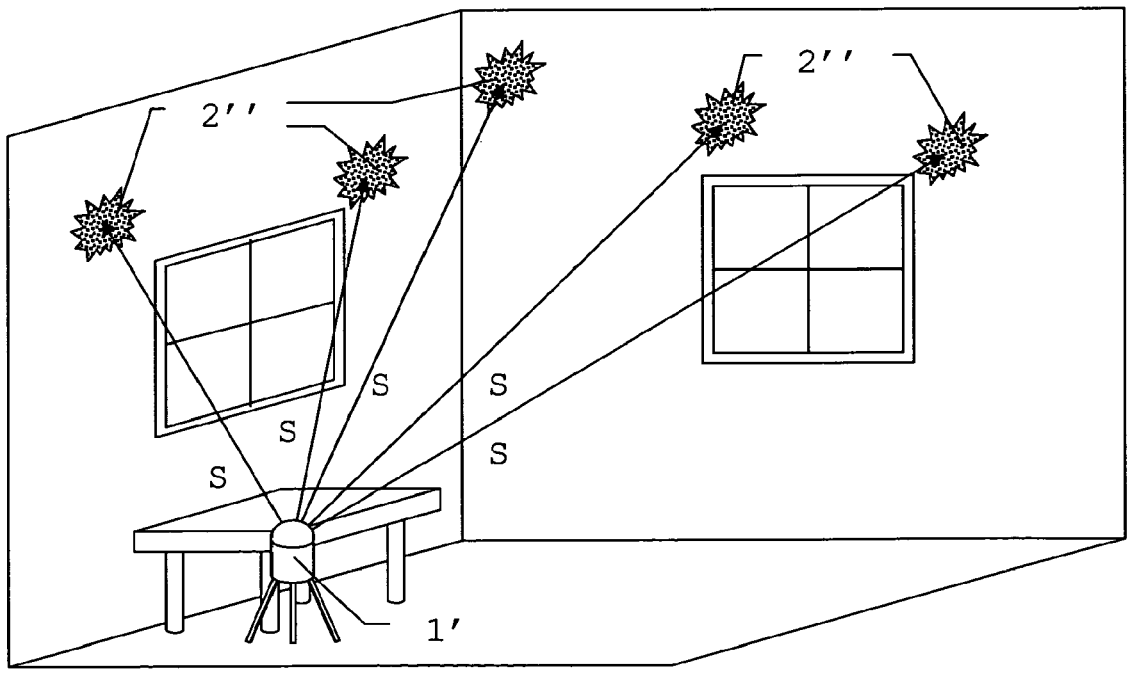
FIG. 4-6 show the diagram of a third use example for the method according to the invention for determining the location of a hand-held measuring device.
Figure 5:
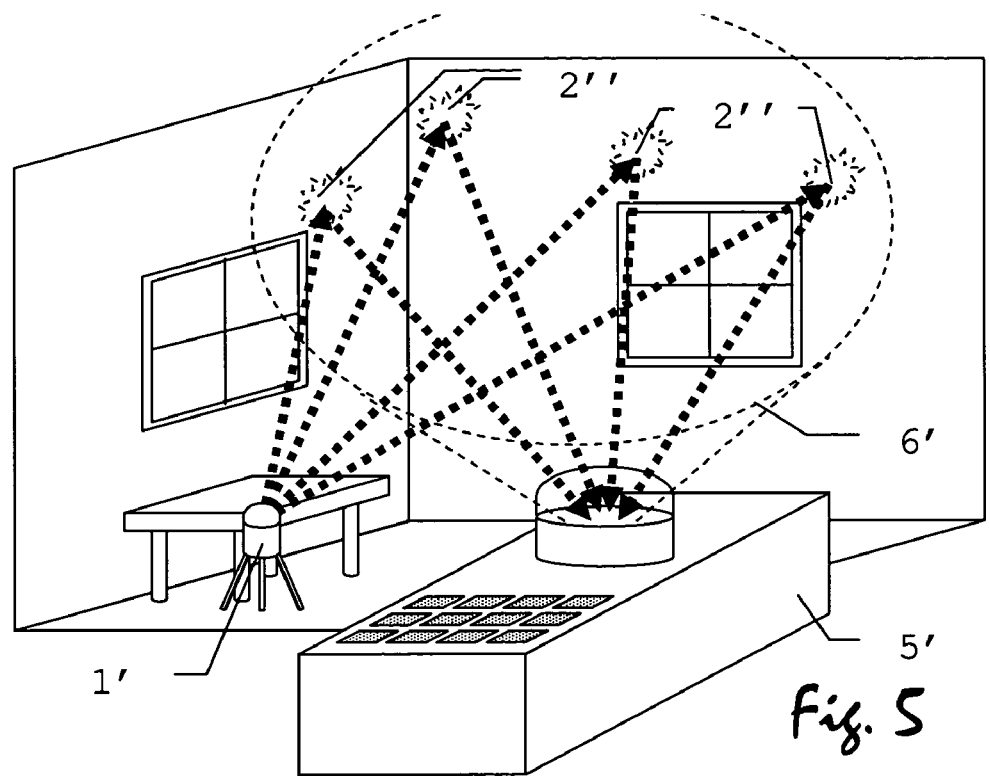
Figure 6:
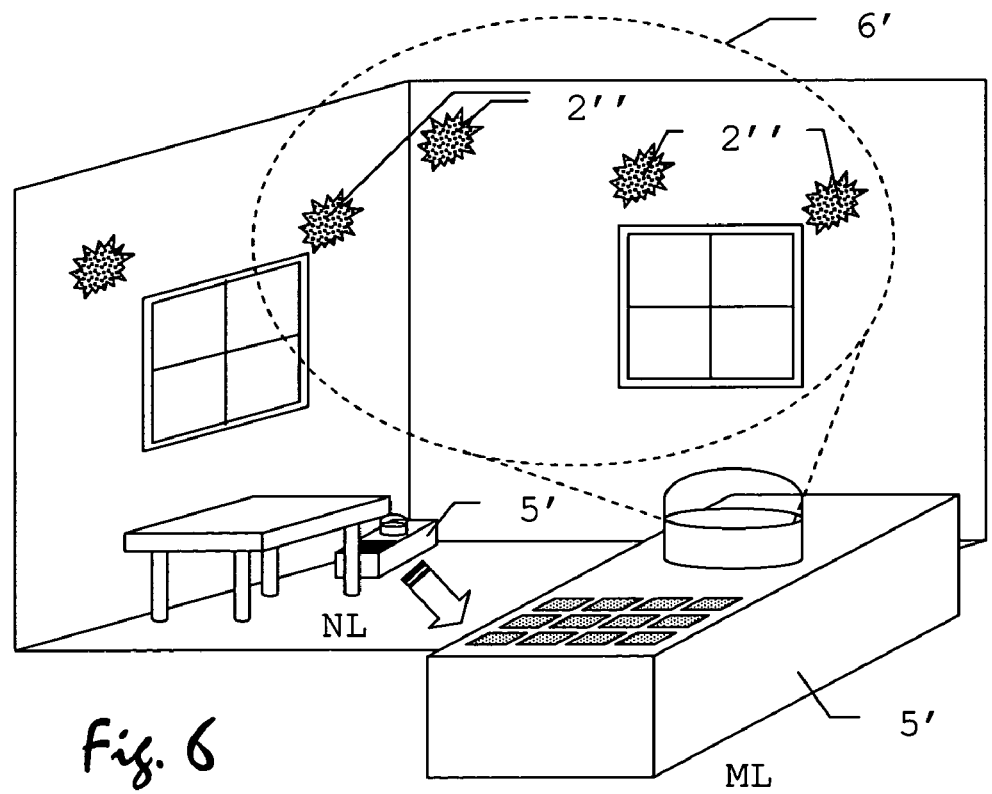

FIG. 4-6 contain the diagram of a third use example for the method according to the invention for determining the location of a hand-held measuring device in the interior of a building. As shown in FIG. 4, a radiation projector 1' is set up in a room in the interior of a building so that said projector is capable of projecting a set of a plurality of reference points 2'' onto the wall with the radiation S generated by it.

A subset of these reference points 2'' is detected by the detection region 6' of a receiver unit 5' so that, as shown in FIG. 5, radiation projector 1' and receiver unit 5' are linked via the distance covered by the radiation. If the coordinates of radiation projector and reference points are known, the position of the receiver unit 5' can in principle be derived from the knowledge of these distances or of the distance segments from reference point 2'' to the receiver unit 5'. The coordinates of radiation projector and reference points can be determined, for example, as part of the setup process by means of a theodolite.

If a determination of the relative location or orientation of the receiver unit 5' is effected, the receiver unit is positioned beforehand in a known zero position NL at the beginning of the procedure, as shown in FIG. 6. In this zero position NL, an initial measurement to the reference points 2'' is effected. After initial measurement is complete, the actual measuring tasks are carried out, the receiver unit 5' being moved to the respective measuring position ML. In the case of a relative position determination, the receiver unit 5' tracks the change of signals superposed on the radiation with respect to the characteristic of these signals in the zero position NL.

If coordinates of radiation and reference points are not known, the method requires a calibration body which fixes the coordinates in the space to be surveyed. In the simplest case, a defined, i.e. measured or surveyed, variable, e.g. a meter rule, can be used as a calibration body if the receiver unit 5' measures the distances covered by the radiation, at least at the two end points. The zero position NL of the relative location of the receiver unit 5' is then given, for example, by the first end of the meter rule, and the coordinate direction and unit length by the second end. For arbitrary positioning in space, however, the calibration with three defined variables in three orthogonal directions is advantageous, so that a calibration body is defined thereby.

For the definition of the unit lengths, it is also possible to use an apparatus within the device. Thus, for example by means of an optical sensor or a roller body, a movement relative to a surface can be registered and surveyed. A calibration of the movement of the receiver unit 5' is then effected from the measured distance relative to the surface and the change of the coordinated measurements to the reference points 2''.

FIG. 7a-d show diagrams of working examples of the radiation projector according to the invention.

FIG. 7a shows a first working example of the radiation projector according to the invention, the projector body 7 having a radiation-permeable cover 8 within which four radiation sources 9a-d are arranged so as to be individually adjustable. The radiation S generated by these radiation sources 9a-d, for example semiconductor lasers, can be aligned manually or automatically for projecting reference points onto suitable objects.

FIG. 7b shows a second working example of the radiation projector according to the invention, comprising an element 10 for scanning beam guidance as a projection means. The radiation S of the radiation source 9e is now projected as a function of time to various locations for producing the set of reference points. The scanning movement can be realized both by classical mechanical components and, for example, by microelectromechanical (MEMS) technology.

In order to determine the coordinates of the reference points and the distances between radiation projector and reference points in a simple manner, the radiation projector itself can be equipped with a distance-measuring and angle-measuring device. This simplifies the setup of the system which is necessary for an absolute location determination. The measurement of the positioning system can, however, also be carried out by using a surveying instrument, such as, for example, a theodolite.

A third working example is explained in FIG. 7c. The beam source 9f used is a pulsed microchip laser, the radiation of which is passed over a plurality of delay lines 11a-c. The orientation of the radiation to be emitted and the projection thereof are effected by means of a plurality of orientation components 12a-d as projection means. Suitable microchip lasers emit over 1 kW as a peak pulse power at a pulse duration of 1 ms. The laser light produced is then coupled into four parallel single-mode fibers of, for example, 1 m, 101 m, 201 m and 301 m length as delay lines, so that a mutual time-related distance of about 500 ns results, which corresponds to a spatial separation of about 150 m. The light passed via the fibers is then collimated by either a scanning element or the orientation components 12a-d as projection means, and the reference points are projected. Owing to the common source, coupling of the four emitted signals takes place, an identical signal characteristic being ensured. For example, 10 kHz can be chosen as the repetition rate of the microchip laser, a certain stabilization being effected via the pumping power or a temperature regulation.

FIG. 7d shows a fourth working example in which a delay is effected in a manner similar to FIG. 7c. Here, for producing various channels, the light of a beam source 9g is coupled into a common delay line 1id, from which, after appropriate distances, in each case a part of the radiation is coupled out by optical splitters or couplers and projected via a coordinated unit of the orientation components 12a-d as projection means.

FIG. 8 shows the signal curves as a function of time for the method according to the invention, based on the transit time measuring principle. In each case variables are plotted as a function of time. At the uppermost point, the ppm-accurate standard time of the receiver unit is shown as a square-wave signal. The received signals from four reference points are shown underneath. The signals emitted as laser pulses have a pulse repetition time $T_{Rep}$, a time window—for example due to the use of delay lines—existing on the transmitter and receiver side for each laser. The duration of the time windows $T_{Laser1}$-$T_{Laser4}$ is identical. Based on the time zero point $t_0$, the receiver unit receives four pulses at the times $t_1$-$t_4$, to which a transit time $t_1'$-$t_4'$ corresponds within the respective time window. These signal curves as a function of time are recorded by the receiver unit in the zero position, and the change, i.e. the change of the times $t_1$-$t_4$ or transit times $t_1'$-$t_4'$, relative to this profile is evaluated continuously for position determination. Here, a corresponding distance can be coordinated with each transit time $t_1'$-$t_4'$. The change of the distances is correlated with a change in location of the receiver unit, so that a change in location or in orientation can be derived. Both the complete distance to the reference point or to the radiation source and only the change of the distance can be evaluated.

An alternatively possible method according to the invention based on the phase measuring principle with measurement of the relative phases is shown in FIG. 9. Once again, the change of the signal characteristic relative to a zero position NL is determined and evaluated for a receiver unit 5' at the location of a measuring position. However, consideration is given to a phase difference $PD_1$ or $PD_2$, which, for reasons of clarity, are shown purely by way of example only for two reference points 2'''. If the phase differences increase over a full cycle, i.e. $2\pi$, these must also be included, since otherwise the relationship with the zero position NL is lost.

FIG. 10 shows the diagram of the method according to the invention based on the phase measuring principle with determination of the absolute phases. In each case, only phase segments are measured, i.e. relative phases from 0 to $2\pi$. The absolute phase is calculated therefrom by resolution of the phase ambiguity. In a manner similar to FIG. 9, the absolute phase $AP_1$ or $AP_2$ for the reference points 2''' is now determined instead of the relative phase. This comprises a resolution of the phase ambiguity which is known from the area of global positioning systems. The distance to the reference point 2''' or to the radiation source is then also defined thereby. In addition to the absolute phase measurement, a determination of the absolute location may also be permitted if, in addition to the location of the radiation source, the position $P_1(x_1, y_1, z_1)$ or $P_2(x_2, y_2, z_2)$ of the reference points 2''' is also known, so that the directions coordinated with the distances $D_1$ and $D_2$ can be determined. This approach then substantially corresponds to the location determination by means of satellites, the reference points serving so to speak as artificial satellites or stars. Consequently, an absolute position determination can also be effected without prior measurement from a zero position, but this approach requires a knowledge of the position $P_1(x_1, y_1, z_1)$ or $P_2(x_2, y_2, z_2)$ of the reference points, which requires either their projection at known locations or prior surveying of the projections.

The realization of a first receiver unit 5' according to the invention is shown in FIG. 11. By means of a wide-angle objective 13, for example having an opening angle of about 120°, with a detection range 6', the radiation from reference points is detected and is passed via a beam splitter 14 with a down-circuit optical system to an image-recording component 15 and a detector 16 for reception of the radiation and for signal processing. The signals thereof are processed in an evaluation unit 17 and analyzed with regard to the location and orientation information. The reference point 16a on the receiver side, from which the 3D position is primarily determined, is the virtual image position which is shown here by means of a dashed line.

For control and operation of the device, it is possible to use generic customary components, such as, for example, an input keyboard 20. In addition, one or more tilt meters 18, for example including biaxial ones, or a high-precision standard time 19, e.g. an atomic clock, can also be integrated. As a result, the number of reference points required for position determination can be reduced or redundancies created.

In this working example based on the transit time measuring principle, the detector 16 receives the pulsed light of the various reference points in succession, i.e. sequentially, separation being possible by the design of the time windows. Alternatively, however, other separation methods, for example of a chromatic nature or by coding, can also be used. The signal is then amplified and digitized, synchronization of the standard time and production of time windows being effected after the first received laser pulse. The delays of the received laser signals are then analyzed with regard to their relative position in the respective time window. A comparison is made with the characteristic at the location of the zero position so that a relative spatial shift is derived. If the standard time is given by a high-precision clock, it is possible to work with only three received reference points. Similarly, tilt meters or additional direction information, for example from the image-recording component 15, can also be integrated. In addition, the image-recording component 15 permits the derivation or orientation information if the change of the position of the reference points relative to their location at the zero position is determined.

In the simplest variant, however, such an image-recording component 15 can be dispensed with if the radiation of at least four reference points can be continuously received. For suppressing troublesome background or ambient light, a narrowband filter, for example an interference filter, can be arranged before the detector. Very narrow interference filters with a high degree of suppression can be used in the case of microchip lasers or wavelength-stabilized laser diodes.

FIG. 12 shows the diagram of a second receiver unit 5" according to the invention, comprising a stylus 21 on which two entry orifices 22 for the radiation or two detectors for distance determination are arranged. By duplication of the location determination, it is also possible to determine the orientation of the receiver unit 5" in space so that image-recording components can be dispensed with. With such a receiver unit, in particular measurements to hidden points are possible. The reference point on the receiver side, from which the 3D position is determined, is by way of example the tip of the stylus 21 here. For operation and control, a visual display 23, for example a liquid crystal display, is arranged on the housing in this second receiver unit 5" according to the invention.

FIG. 13a-b shows the diagram of a third receiver unit 5''' according to the invention, which is formed specially for placing on surfaces or points to be measured. The functionality of the receiver unit 5''' can once again be controlled via an input keyboard 20' and a visual display 23'. The reference points can be detected by a wide-angle objective 13' having a detection range 6". The reference point 16b of the detector 16' on the receiver side, as shown in FIG. 13b, lies in a plane EB within the housing 24. In order to be able to carry out measurements in which a surface or a contact point with an object represents the reference point, the receiver unit 5''' has defined distances A1-A3 from the reference point 16b on the receiver side to the lateral surfaces of the housing 24. The linkage of measurements to the reference point 16b on the receiver side can be ensured manually via control by means of input keyboard 20' or by pushbuttons 25. On contact with an object to be surveyed, the respective push button 25 is pressed in and hence the coordinated defined distance A1, A2 or A3 is selected and is linked with the reference point 16b on the receiver side in the evaluation. The housing 24 of the receiver unit 5''' has a sphere as a movement-sensitive calibration component 26, the rolling behavior of which is surveyed with regard to the distance covered. Thus, calibration of the movement within the device is also possible without an external reference quantity, such as, for example, a meter rule. In order to define a movement in three orthogonal directions, the receiver unit 5''' can then be guided in two perpendicular movements over the floor of a room and in one movement over a side wall of the room. After the calibration permitted thereby, a location and/or orientation determination can then be carried out without direct contact with the surface. In addition to contact-controlled systems, systems measuring without contact, as, for example, in the case of an optical computer mouse, can also be used as calibration components 26.

In the figures, the steps of the method, buildings and instruments used are shown purely schematically. In particular, no size relationships or details of the image processing or surveying of the reference points are revealed in the diagrams. The points shown only by way of example as reference points also represent more complex structures or the elements defining a point, such as, for example, spheres or reflective foils.

Of course, the system according to the invention for position determination also permits the simultaneous use of a plurality of receiver units.

The invention claimed is:

1. A method for determining a position of a receiver unit, the receiver unit including at least one radiation projector which is capable of being positioned independently of the receiver unit and having at least one laser source for projecting at least one detectable reference point of a set of reference points, the receiver unit being configured to detect reference points of the set of reference points and the set of reference points having at least three reference points, the method comprising the following acts:

generating modulated electromagnetic radiation for projecting the reference points;

projecting at least three reference points detectable by the receiver unit;

detecting the radiation of at least three projected reference points of the set of reference points by the receiver unit; and deriving position information including location and/or orientation information, for the receiver unit from the detected radiation, wherein:

a set of detectable radiation or light spots is produced by the at least one radiation projector and said spots are detected and evaluated as reference points by the receiving unit, and the number of reference points is determined by the number of laser projections.

2. The method as set forth in claim 1, wherein modulated electromagnetic radiation is intensity-, phase-, or polarization-modulated.

3. The method as set forth in claim 1, wherein four reference points are projected and four reference points are detected.

4. The method as set forth in claim 1, wherein the position information is derived on the basis of a relative position, as a function of time, of a signal superposed on the radiation, or a phase segment of the detected radiation.

5. The method as set forth in claim 4, wherein the position information is derived relative to a zero position on the basis of a change of the relative position, as a function of time, of the signal superposed on the radiation or a phase change of the detected radiation.

6. The method as set forth in claim 1, wherein the projection and/or the detection is effected simultaneously for at least three detectable reference points.

7. The method as set forth in claim 1, wherein the radiation for projecting the reference points is emitted with mutually phase-rigid or time-rigid coupling.

8. The method as set forth in claim 1, wherein the radiation for projecting the reference points is emitted with pulses having a defined time relationship.

9. The method as set forth in claim 8, wherein the defined time relationship includes a delay relative to one another for the individual reference points in the range of hundreds of nanoseconds.

10. The method as set forth in claim 1, wherein the radiation is generated with different characteristics for the individual reference points.

11. The method as set forth in claim 10, wherein the different characteristics includes modulation with reference point-specific frequency, choice of a reference point-specific optical carrier wavelength, and/or superposition of reference point-specific information by modulation.

12. The method as set forth in claim 1, wherein the radiation for projecting a distinct reference point is coded or made distinguishable.

13. The method as set forth in claim 12, wherein the radiation for projecting a distinct reference point is coded or made distinguishable by chromatic characterization.

14. The method as set forth in claim 1, wherein a distance determination between the receiver unit and the reference points is effected by the phase or transit time measuring principle, the phase measurement determining the absolute or relative phase.

15. The method as set forth in claim 14, wherein, for determining the absolute location of the receiver unit, the position information is derived from the distance determination between the receiver unit and the reference points and a knowledge of the absolute location of the reference points.

16. A system for determining a location and/or an orientation of a receiver unit, comprising:

a reference point generation means for projecting at least three reference points with at least one first radiation projector which has at least one first laser source configured to generate coded or modulated electromagnetic radiation; and a receiver unit with at least one detector for simultaneous reception of the radiation of the at least three reference points, the detector and an evaluation unit being configured to derive a change of the relative position of a signal as a function of time or a phase change for the radiation of the at least three reference points, wherein the reference point generation means is configured to be independently positioned relative to the receiver unit, wherein:

the reference point generation means is configured to produce a set of detectable radiation or light spots, and the detector and evaluation unit are configured to detect and evaluate said spots as reference points by the receiver unit, the number of reference points being determined by the number of projections.

17. A system as set forth in claim 16, wherein the reference point generation means is configured to generate intensity-, phase- or polarization-modulated electromagnetic radiation.

18. The system as set forth in claim 16, wherein the first radiation projector is formed for the projection of at least two detectable reference points simultaneously and/or in a manner orientable independently of one another.

19. The system as set forth in claim 16, wherein the first radiation projector has at least one second laser source, wherein the first laser source and the second laser source are orientable independently of one another.

20. The system as set forth in claim 16, wherein the first radiation projector has projection means which are formed so that the radiation of the first laser source is oriented for projection of at least two reference points.

21. The system as set forth in claim 20, wherein the first radiation projector has projection means which are formed so that the radiation of the first laser source is sequentially oriented for projection of at least two reference points.

22. The system as set forth in claim 20, wherein the projection means includes an element for scanning beam guidance.

23. The system as set forth in claim 16, wherein the radiation of the first laser source is divided between at least two optical delay lines.

24. The system as set forth in claim 23, wherein the first laser source includes a microchip laser and the radiation of the first laser source is divided between four optical delay lines by single-mode fibers of different length.

25. The system as set forth in claim 16, wherein the receiver unit is direction-sensitive, so that a direction determination is effected on reception of the radiation of the at least three reference points by an image-recording component.

26. The system as set forth in claim 16, wherein the receiver unit includes a biaxial tilt meter.

27. The system as set forth in claim 16, wherein the receiver unit includes a geodetically precise standard time as a local oscillator.

28. The system as set forth in claim 27, wherein the geodetically precise standard time includes an atomic clock.

29. The system as set forth in claim 16, wherein the receiver unit includes at least one switching element for taking into account a defined distance from a reference point of the detector on the receiver side to a contact surface of the receiver unit.

30. The system as set forth in claim 16, wherein the receiver unit includes a movement-sensitive calibration component, the calibration component being configured to calculate a distance covered by the movement of the receiver unit.

31. The system as set forth in claim 16, further comprising at least one reference object reflecting diffusely or in a directed manner.

32. The system as set forth in claim 31, wherein the reference object includes a sphere or a segment of a sphere.

33. The system as set forth in claim 16, wherein the reference point generation means includes at least one second radiation projector, the first and the second radiation projector including a communication link for synchronization of the projection of the reference points.

34. The system as set forth in claim 33, wherein the communication link is a wireless communication link.

* * * * *